UNITED STATES PATENT OFFICE.

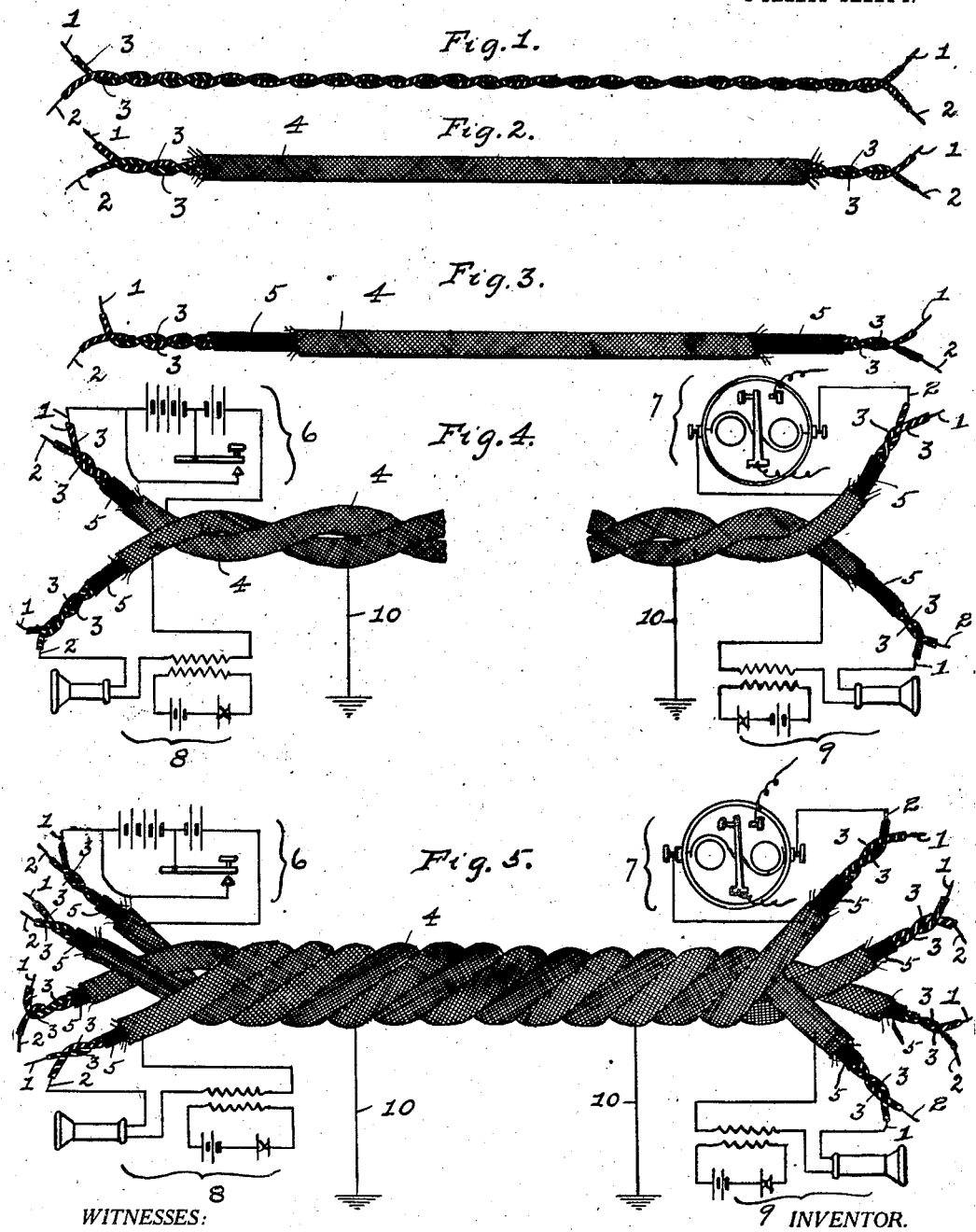

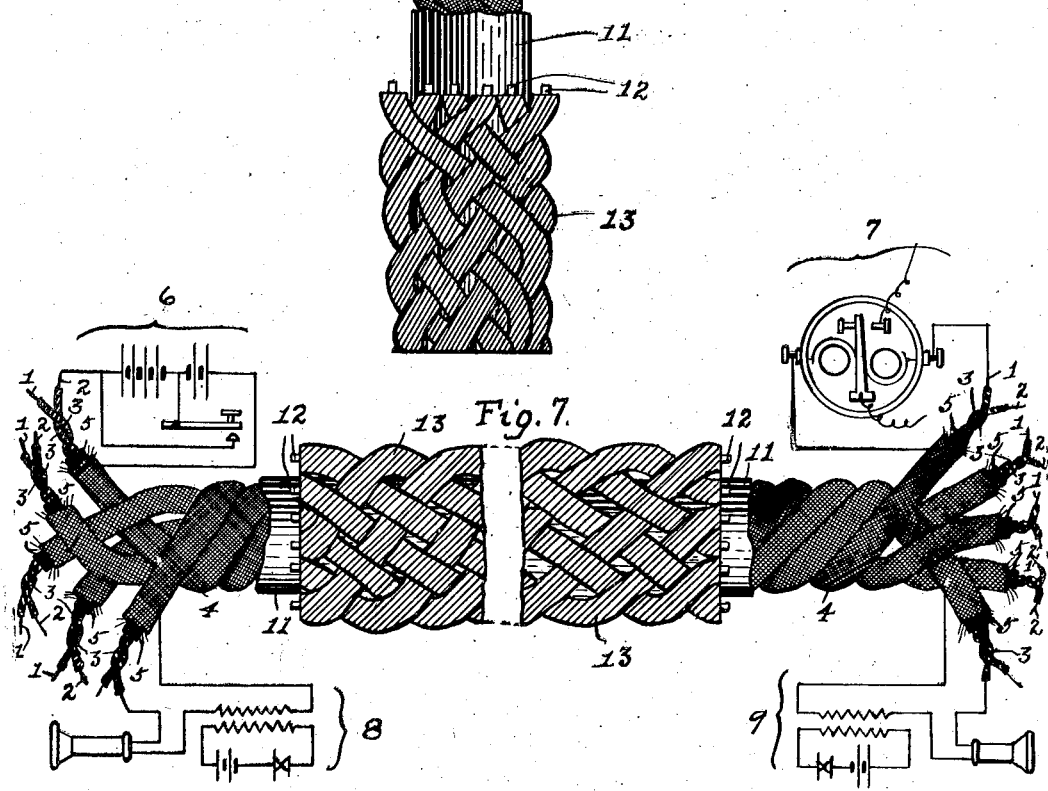

ISIDOR KITSEE, OF PHILADELPHIA, PENNSYLVANIA, ASSIGNOR, BY DIRECT AND MESNE ASSIGNMENTS, TO AMERICAN TELEPHONE AND TELEGRAPH COMPANY, OF NEW YORK, N. Y., A CORPORATION OF NEW YORK.

ELECTRIC TRANSMISSION OF INTELLIGENCE.

1,083,258.      Specification of Letters Patent.      Patented Dec. 30, 1913.

Application filed April 11, 1908, Serial No. 426,493. Renewed July 8, 1913. Serial No. 777,960.

*To all whom it may concern:*

Be it known that I, ISIDOR KITSEE, citizen of the United States, residing at Philadelphia, in the county of Philadelphia and State of Pennsylvania, have invented certain new and useful Improvements in Electric Transmission of Intelligence, of which the following is a specification.

My invention relates to an improvement in the transmission of intelligence with the aid of electric energy.

In general, my invention comprises the construction and use of such a line that the effects of induction are utilized for the transmission of intelligence and it has more special reference to the construction of such a circuit and assembling of a series of circuits in a cable.

In my experiments, I have found that if two conductors insulated from each other but in inductive relation to each other, are connected to the ground, they are subject to induction from a neighboring circuit, no matter if this neighboring circuit is metallically or inductively arranged. It was also ascertained by me, that a circuit consisting of three conductors inductively connected to each other, so as to produce one open circuit, is immune from all disturbances of neighboring circuits. In the course of experiments covering a number of years, I made use of circuits having a lineal length of over one hundred miles, these circuits being inductively connected and I found then,— in the course of these experiments,—that the best arrangement to produce an immune circuit is to first arrange two insulated conductors in intimate inductive relation to each other, and then cover both conductors with one metallic braiding; but as in my experiments, the insulation of the conductors proper—when the same was not of great thickness—was easily abrased, I found it necessary to first inclose the conductors in a tube of non-conducting material and then cover this tube with a braiding of conducting material. In the assembling of such a circuit, that is, a circuit consisting of two insulated wires contained in a non-conducting envelop and then surrounded by a conducting braiding—into a cable and more specially into a submarine cable—I have recourse to an arrangement substantially as is illustrated in the accompanying drawing.

In this drawing, Figure 1 is a plan view of a circuit consisting of two conductors insulated from each other but in intimate twist with each other. Fig. 2 is a plan view of a circuit comprising two conductors and a conducting envelop for same. Fig. 3 is a similar view of the two conductors contained in a non-conducting envelop and surrounded by a conducting braiding. Fig. 4 is a partial plan and partial diagrammatic view of two circuits, one circuit connected inductively to telephonic stations and the second of said circuits connected inductively to telegraphic stations; the circuits being grounded through their conducting braiding. Fig. 5 is a similar view of four circuits. Fig. 6 is a plan view of part of a submarine cable comprising five circuits. Fig. 7 is a partial plan and partial diagrammatic view of a submarine cable comprising five circuits, of which two circuits are connected for the purpose of transmitting intelligence.

It has to be borne in mind that to-day it is only possible to inclose one circuit in a submarine cable for the practical operation of telegraphy. It was attempted to place two circuits for short submarine cables, but this attempt had to be abandoned on account of cross-induction.

With my invention, it is possible to assemble a series of circuits into one submarine cable, no matter if the same is of shorter or greater length and to telegraph or telephone over same—for each circuit separately—without any interference between said circuits.

In the drawings, 1 and 2 are the two conductors of—what I call—the inductive circuit.

3, 3, are the insulation for each of said conductors.

4 is the metallic braiding.

5 is the non-conducting envelop between the braiding and the circuit.

6 is the transmitting organism and 7 the receiving organism for telegraphic transmission.

8 and 9 are telephonic stations, each station comprising transmitting and receiving devices.

10 and 10 are the ground connections for the conducting braiding.

In Figs. 6 and 7, 11 is a conducting sheet surrounding the braidings of a series of circuits. 12 is the iron armor comprising a series of iron conductors insulated through the non-conducting material 13.

I have to state that in my experiments, I made use of different means to produce the metallic envelop for the circuit proper, but I found that, in practice, none is as efficient and economical as a braiding consisting of a series of metallic threads or even thin wires. I found also that to give strength and ductility to the circuit, it is best to produce these metallic threads out of a composition consisting of about from eighty to eighty seven per cent. of copper and from thirteen to twenty per cent. of zinc. I have tried to have each circuit separately leaded and then inclosed again in a common lead sheet, but I found such circuit wanting of the necessary strength and too cumbersome for practical purposes.

In the manufacturing of submarine cables, I prefer the outer armor to be braided so as to form interstices for the purpose of allowing the surrounding water to come in contact with the metallic shield.

Having now described my invention, what I claim as new and desire to secure by Letters Patent is:—

1. A submarine cable comprising a series of electric circuits, each of said circuits consisting of three conductors insulated from each other, two of said conductors connected inductively to each other and conductively to the third conductor, said third conductor consisting of a metallic braiding surrounding said first two named conductors, necessary apparatus between the first named conductors and the third conductor; a solid conducting shield surrounding said metallic braiding and a protective armor surrounding said solid conducting shield.

2. In a submarine cable, a series of inductive circuits, means to make immune one circuit from the inductive influence of the second circuits, said means comprising for each of said circuits a third conductor consisting of a metallic envelop surrounding said circuit; one end of one conductor of said circuit in electric connection, with the interposition of necessary devices, to said metallic envelop; the other end of said conductor being left unconnected; the opposite end of the second conductor being connected to said metallic envelop with the interposition of necessary devices and the second end of said conductor being left free and unconnected; a metallic sheet enveloping all of said circuits, said metallic sheet adapted to be brought in contact with the surrounding water.

3. A submarine cable comprising a series of inductive circuits consisting each of two inductively related conductors and a third conductor as a return, said third conductor enveloping the first named two conductors; the third conductors of all of the circuits in electric connection with each other; a metallic shield for all of said conductors and means to bring said metallic shield in contact with the surrounding water.

4. An electric cable comprising a series of lines of transmission, each line of transmission comprising three conductors, two conductors in the shape of wires and insulated from each other and the third conductor in the shape of a metallic braiding surrounding the first two named conductors and insulated from same, in combination with a metallic shield surrounding the braidings of all circuits.

In testimony whereof I affix my signature in presence of two witnesses.

ISIDOR KITSEE.

Witnesses:
EDITH R. STILLEY,
MARY C. SMITH.